United States Patent [19]

Yoshiura et al.

[11] 3,970,632
[45] July 20, 1976

[54] PIGMENT CONTAINING POLYOLEFIN COMPOSITION

[75] Inventors: Hirohisa Yoshiura; Toshiharu Arai; Masao Miyake; Kiyoshi Enriki, all of Kurashiki, Japan

[73] Assignee: Mitsubishi Chemical Industries Ltd., Tokyo, Japan

[22] Filed: Nov. 27, 1974

[21] Appl. No.: 527,651

[30] Foreign Application Priority Data
Nov. 27, 1973  Japan............................ 48-132912

[52] U.S. Cl............................ 260/42.21; 260/42.46; 526/45.80 N
[51] Int. Cl.²............................................ C08J 3/20
[58] Field of Search......... 260/42.21, 42.46, 45.8 N, 260/289 QP

[56] References Cited
UNITED STATES PATENTS

| | | | |
|---|---|---|---|
| 3,374,238 | 3/1968 | Wick et al. | 260/289 QP |
| 3,788,810 | 1/1974 | Kalz et al. | 260/289 QP |
| 3,790,525 | 2/1974 | Murayama et al. | 260/45.8 N |
| 3,793,331 | 2/1974 | Kalz et al. | 260/289 QP |
| 3,816,431 | 6/1974 | Konishi et al. | 260/289 QP |
| 3,840,494 | 10/1974 | Murayama et al. | 260/45.8 N |
| 3,859,293 | 1/1975 | Murayama et al. | 260/45.8 N |

*Primary Examiner*—Hoke V. P.
*Attorney, Agent, or Firm*—Oblon, Fisher, Spivak, McClelland & Maier

[57] ABSTRACT

A polymer composition, which comprises a polymer containing a quinophthalone pigment having the formula

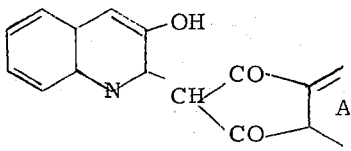

wherein the quinoline ring can have a substituent selected from the group consisting of halogen, lower alkyl, lower alkoxy, and carboxyl, and the ring A is a benzene ring or a naphthalene ring which can have a substituent selected from the group consisting of halogen, and —COW wherein W represents hydroxyl, lower alkoxyl or amino; and 0.005–5% by weight of a piperidine type or imidazolidine type ultraviolet absorbing agent.

3 Claims, No Drawings

PIGMENT CONTAINING POLYOLEFIN COMPOSITION

BACKGROUND OF THE INVENTION

1. Field of the Invention

The present invention relates to a polymer composition. More particularly, the present invention relates to a polymer composition which has high stability to ultraviolet rays and has high fade resistance.

2. Description of the Prior Art

When a molded product made of a polymer such as a polyolefin or a polystyrene is exposed to light, the mechanical properties and the electrical properties of the product deteriorate. In order to improve the mechanical and electrical properties, various ultraviolet absorbing agents or light stabilizing agents have been incorporated in the polymer.

On the other hand, colored compositions composed of a resin and a pigment may fade upon exposure which diminishes the commercial value of the compositions.

In practice, when conventional ultraviolet absorbing agents are used for polymers such as benzotriazol type or benzophenone type ultraviolet absorbing agents, the fading problem has been serious in the commercial products, especially those products used outdoors.

A need therefore, continues to exist for a method of stabilizing polymer materials from deterioration of their mechanical and electrical properties upon exposure to light.

SUMMARY OF THE INVENTION

Accordingly, one object of the present invention is to provide a pigment containing polymer composition which has high stability to light and high fade resistance.

Briefly, this object and other objects of the invention as hereinafter will become more readily apparent can be attained by a polymer containing a quinophthalone pigment and from 0.005–5% by weight of a piperidine or imidazolidine ultraviolet absorbing agent.

DETAILED DESCRIPTION OF THE PREFERRED EMBODIMENTS

In the present invention, the polymers which are the base resins of the invention include polyolefins such as polyethylene, polypropylene, polybutadiene, polyisoprene, ethylene-propylene copolymers, ethylenebutene copolymers, ethylene-vinylacetate copolymers, polystyrene, polyvinylchloride, polyacrylonitrile, styrene-acrylonitrile copolymer, ABS resins, acrylic resins, methacrylic resins, polyacetal, polyamides, polycarbonates, epoxy resins, and the like.

The quinophthalone type pigments used in the invention can be represented by the formula

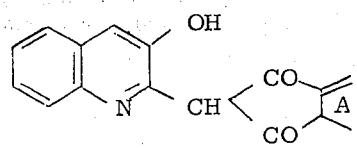

wherein the quinoline ring can have substituent groups and the ring A is a benzene ring or a naphthalene ring which can have substituent groups. The substituent groups on the quinoline ring include halogen, lower alkyl groups, lower alkoxy groups, carboxyl groups, and the substituent groups on the A ring include halogen and —COW wherein W represents hydroxyl, lower alkoxyl or amino. Among the quinophthalone type pigments, the pigments wherein A is a naphthalene ring is especially preferred.

The quinophthalone type pigment can be prepared by reacting a quinoline derivative having the formula

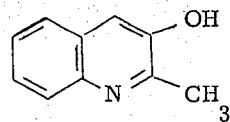

wherein the quinoline ring can have suitable substituent groups, with naphthalene-2,3-dicarboxylic acid, naphthalene-1,2-dicarboxylic acid or phthalic acid having the formulas

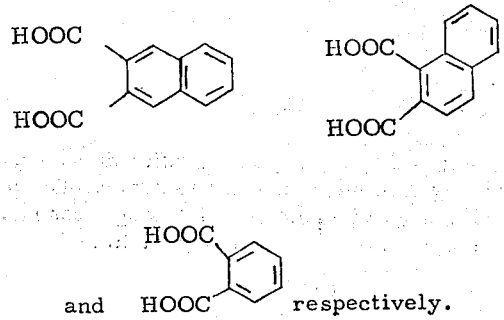

and respectively.

wherein the benzene or naphthalene rings can have substituent groups. More particularly, the quinophthalone type pigments can be represented by the following formulas

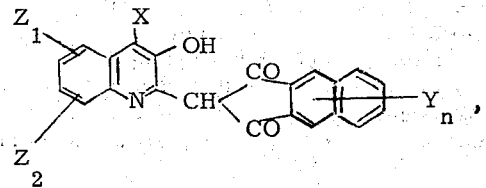

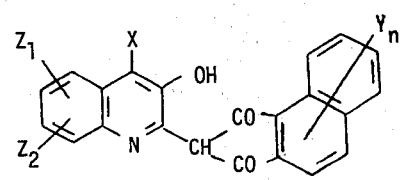

and

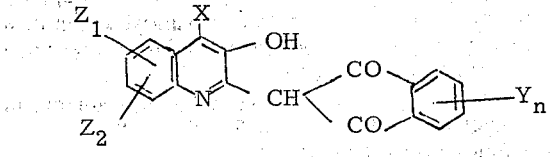

wherein X represents hydrogen or halogen, Y represents halogen, $Z_1$ represents hydrogen, halogen, lower alkyl or lower alkoxy, $Z_2$ represents hydrogen or halogen, and $n$ represents 0 or an integer of 1–4. The amount of the quinophthalone type pigment used can be usually in the range of 0.01–2% by weight based on the polymer such as a polyolefin.

The piperidine type ultraviolet absorbing agents of the present invention include the following derivatives having the formula

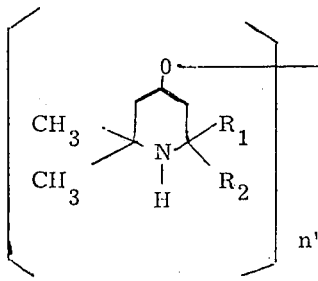  .... (1)

wherein $R_1$ and $R_2$ are the same or different and each represents an alkyl group or forms a saturated alicyclic ring having 5–7 carbon atoms and sharing a common carbon atom or a ring system having the formula

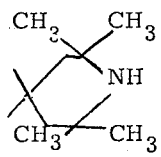

and $n'$ represents an integer of 1, 2 or 3;
$R_3$ represents, in the case of $n' = 1$, a monovalent acyl group,
an N-substituted carbamoyl group;
an N-substituted thiocarbamoyl group,
a monovalent group formed by removing one hydroxyl from an oxyacid, an alkyl, a cycloalkyl, an aralkyl or aryl group or a group having the formula

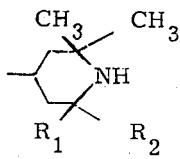

wherein
$R_1$ and $R_2$ are defined above;
$R_3$ represents, in the case of $n' = 2$, a diacyl, a dicarbamoyl, a bisthiocarbamoyl, a carbonyl group, or a divalent group formed by removing two hydroxyl groups from an oxyacid, an alkylene, an arylene, or an arylenedialkylene group;
$R_3$ represents, in the case of $n' = 3$, a triacyl group, a tricarbamoyl group, a tristhiocarbamoyl group, a trivalent group formed by removing three hydroxyl groups from an oxyacid;
an alkanetolyl group, an arylinetolyl group or an arylinetolyltrialkylene group.

Suitable piperidine derivatives include 4-benzoyloxy-2,2,6,6-tetramethyl piperidine having the formula

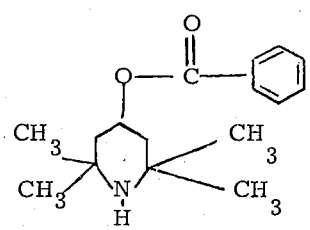

Suitable piperidine derivatives also include piperidine-4-spiro-hydantoin derivatives having the formula

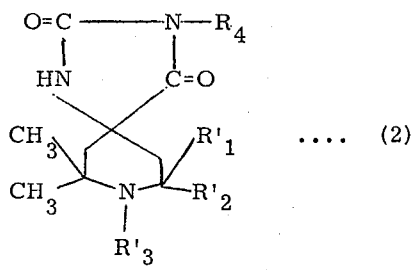  .... (2)

wherein $R'_1$ and $R'_2$ are the same or different and each represents an alkyl group or forms a saturated alicyclic ring having 5–7 carbon atoms and sharing a common carbon atom, or a ring having the formula

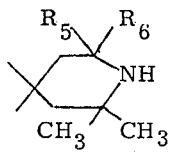

wherein
$R_5$ and $R_6$ are the same or different and each represents an alkyl group or forms a saturated alicyclic ring having 5–7 of carbon atoms and sharing a common carbon atom;
$R'_3$ and $R_4$ are the same or different and each represents hydrogen, an alkyl group, a cycloalkyl group or an aryl group and can have an oxirane oxygen. A preferred piperidine compound is 1,3,8-triaza-7,7,9,9-tetramethyl-2,4-dioxospiro (4.5) decane.

Suitable piperidine derivatives further include piperidine derivatives or organic acid salts thereof having the formula

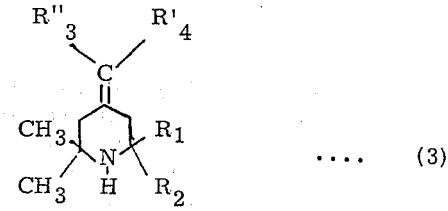  .... (3)

wherein $R_1$ and $R_2$ are defined in the formula 1, and $R''_3$ and $R'_4$ are the same or different and each represents a cyano group, an aryl group, an alkoxycarbonyl group, an acyl group or a carbamoyl group. A preferred piperidine compound is 4-(α,α-dicyanomethylene)-2,2,6,6-tetramethyl piperidine.

Still further piperidine derivatives or organic acid salts include those having the formula

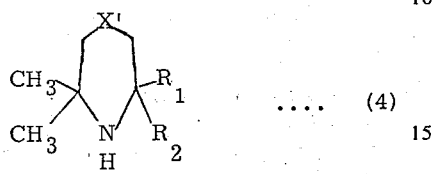   .... (4)

wherein $R_1$ and $R_2$ are as defined in formula (1), and $X'$ represents

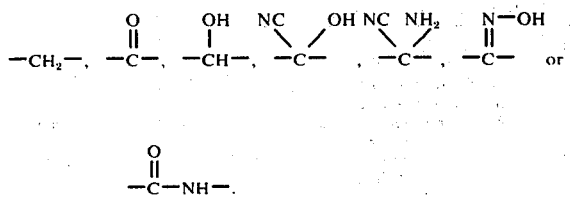

A preferred compound is 2,2,2,6-tetramethyl piperidine.

Other piperidine derivatives include iminopiperidine derivatives or organic acid salts thereof having the formula

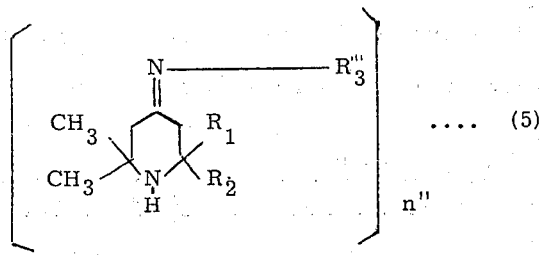   .... (5)

wherein $R_1$ and $R_2$ are as defined in formula (1), and $n''$ represents an integer of 1 or 2, $R'''_3$ represents, in the case of $n'' = 1$, an alkyl group, an aralkyl group, a cycloalkyl group, an aryl group, an arylamino group, a ureido group, a thioureido group or a group having the formula

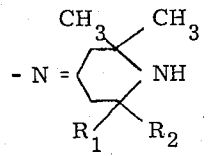

wherein $R_1$ and $R_2$ are as defined in formula (1), and $R'''_3$ represents, in the case of $n'' = 2$, a straight chain or a branched chain alkylene group, a cycloalkylene group, an arylene group, and a group having the formula

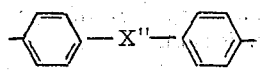

wherein $X''$ represents —O—, —S—, —S—S—, —NH— or —(CH$_2$)—$_m$ and $m$ represents 0 or an integer of 1–6. A preferred compound is 4-n-butylimino-2,2,6,6-tetramethylpiperidine.

The imidazolidine ultraviolet absorbing agents used in the present invention include compounds having the formula

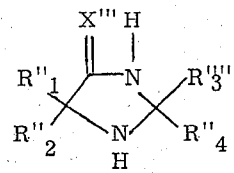

wherein $X'''$ represents oxygen or sulfur and $R''_1$ and $R''_2$ are the same or different and each represents hydrogen, alkyl group, a cycloalkyl group, an aryl group or a heterocyclic ring or $R''_1$ and $R''_2$ can form a saturated alicyclic ring having 5–7 carbon atoms and sharing a common carbon or a ring having the formula

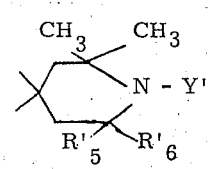

wherein $R'_5$ and $R'_6$ are the same or different and each represents an alkyl group and $Y'$ represents hydrogen or an oxygen radical, and $R''''_3$, $R''_4$ are the same as $R''_1$ and $R''_2$.

A preferred compound is cyclohexane-1-spiro-2'-(4'-oxoimidazolidine)-5'-spiro-1''-cyclohexane.

The amount of the piperidine or the imidazolidine ultraviolet absorbing agent used is usually in the range of 0.005–5% by weight, preferably 0.01–1% by weight based on the polymer.

When the piperidine derivative or the imidazolidine derivative is admixed with the polymer, the conventional method for admixing an ultraviolet absorbing agent can be applied.

It is possible to add other stabilizers used for the polymers such as other antioxidants or ultraviolet absorbing agents.

Having generally described this invention, a further understanding can be obtained by reference to certain specific examples which are provided herein for purposes of illustration only and are not intended to be limiting unless otherwise specified.

EXAMPLE 1

A high density polyethylene (NOVATEC JV040 Melt Index=5) was admixed with a specific amount of the ultraviolet absorbing agent shown in Table 1, and the mixture was blended by a ribbon blender and was pelletized by an extruder.

One hundred parts by weight of the pellets was admixed with 0.8 parts by weight of a yellow pigment composition containing 15% of a quinophalone pigment having the formula

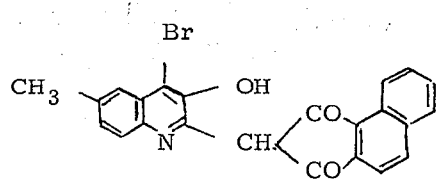

and the mixture was injected by an injection molding machine to form a flat plate test piece.

The test piece was irradiated for a specific period in a weather meter manufactured by Toyo Rika Sangyo K. K. (black panel temperature 63°C; humidity 75%). The changes in Hunter whiteness before and after the irradiation were measured by a coloric and gloss meter manufactured by Nippon Denshoku Kogyo K. K.

The results are shown in Table 1.

TABLE 1

| Ultraviolet absorbing agent | 2-hydroxy-4-octoxy benzophenone 0.1% | | | | 4-benzoyloxy-2,2,6,6-tetramethylpiperidine 0.1% | | | |
|---|---|---|---|---|---|---|---|---|
| irradiation period | L | a | b | W | L | a | b | W |
| 0 | 74.8 | 9.6 | 41.6 | 50.5 | 72.8 | 11.4 | 41.6 | 49.1 |
| 750 hrs. | 78.7 | 9.3 | 30.8 | 61.4 | 75.2 | 12.0 | 36.8 | 54.0 |
| 1000 hrs. | 78.9 | 7.9 | 28.6 | 63.6 | 75.5 | 11.0 | 33.9 | 56.7 |
| 1250 hrs. | 79.7 | 7.8 | 26.7 | 65.6 | 76.2 | 10.9 | 31.7 | 58.9 |
| 1500 hrs. | 80.2 | 7.5 | 25.6 | 66.7 | 76.4 | 10.7 | 30.7 | 59.9 |

It is clear from Table 1, that the Hunter whiteness values, especially the difference ($\Delta b$) before and after irradiation, which measures the amount of fading, in the case of the addition of 4-benzoyloxy-2,2,6,6-tetramethylpiperidine ($\Delta b = -10.9$ for 1500 hrs.) was remarkably superior than the $\Delta b$ value of benzophenone ($\Delta = -16.0$ for 1500 hrs.).

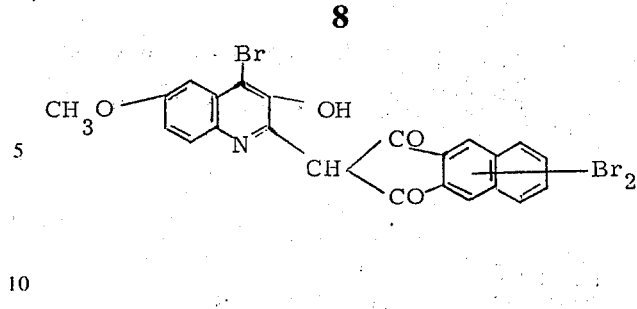

and the ultraviolet absorbing agents shown in Table 2 was used.

The changes in the Hunter whiteness values were measured.

The results are shown in Table 2.

TABLE 2

| Ultraviolet absorbing agent | | Amount | |
|---|---|---|---|
| (1) | 2-(2'-hydroxy-3', 5'-di-t-butylphenyl)-5-chlorobenzotriazol | 0.03% | 0.065% |
| (2) | 4-benzoyloxy-2,2, 6,6-tetramethylpiperidine | 0.03% | 0.065% |
| Fade ($\Delta b$) | 250 hrs. | −1.6 | −1.3 |
| | 500 hrs. | −3.0 | −2.4 |
| | 710 hrs. | −4.2 | −3.2 |
| | 900 hrs. | −5.7 | −4.2 |

EXAMPLE 3

The process of Example 2 was repeated except that the ultraviolet absorbing agents shown in Table 3 were used.

The changes in Hunter whiteness values were measured.

The results are shown in Table 3.

TABLE 3

| Ultraviolet absorbing agent | | Amount | | | |
|---|---|---|---|---|---|
| (1) | 1,3,8-triaza-7,7,9,9-pentamethyl-2,4-dioxo-spiro[4.5]decane | 0.1% | — | — | — |
| (2) | 1,3,8-triaza-3-(2',3'-epoxy-propyl)-7,7,8,9,9-pentamethyl-2,4-dioxo-spiro[4.5]decane | — | 0.1% | — | — |
| (3) | 1,3,8-triaza-3-octyl-7,7,9,9-tetramethyl-8-benzyl-2,4-dioxo-spiro[4.5]decane | — | — | 0.1% | — |
| (4) | cyclohexane-1-spiro-2'-(4-oxoimidazolidine)-5'-spiro-1''-cyclohexane | — | — | — | 0.1% |
| (5) | 2-(2'-hydroxy-3',5'-di-t-butyphenyl)-5-chlorobenzotriazol | 0.1% | 0.1% | 0.1% | 0.1% |
| Fade ($\Delta b$) | 250 hrs. | −2.2 | −1.9 | −2.3 | −1.9 |
| | 500 hrs. | −5.3 | −4.5 | −5.5 | −4.5 |
| | 710 hrs. | −8.5 | −7.3 | −8.8 | −7.3 |
| | 900 hrs. | −11.0 | −9.5 | −11.5 | −9.5 |
| | 1150 hrs. | −13.6 | −11.6 | −14.0 | −11.6 |

EXAMPLE 2

The process of Example 1 was repeated except that a yellow pigment composition containing 10% of the following quinophthalone pigment having the formula

EXAMPLE 4

The process of Example 1 was repeated except that the following quinophthalone pigments (A)–(E) were used.

The changes in Hunter whiteness values before and after irradiation were measured.

The fade resistance effects were the same with those of Example 1.

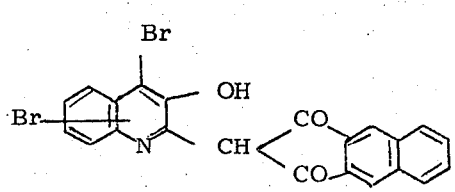
(A)

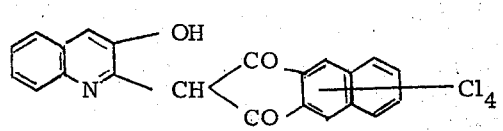
(B)

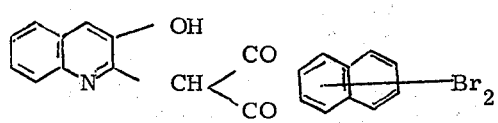
(C)

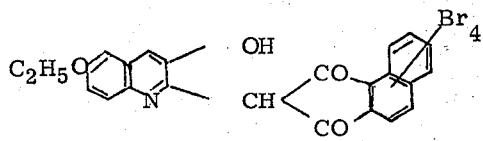
(D)

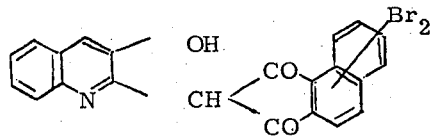
(E)

EXAMPLE 5

A quinophthalone pigment having the formula

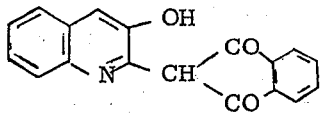

and the ultraviolet absorbing agent 1,3,8-triaza-7,7,9,9-tetramethyl-3-octyl-2,4-dioxo-spiro[4.5] decane were admixed with polystyrene pellets (DIAREX HF 77) acrylonitrile-styrene copolymer pellets (SANREX SAN-C) and ABS resin pellets (TUFREX 410).

The mixture were respectively treated by the process of Example 1. The changes in the Hunter whiteness values before and after irradiation were measured. Fade resistance effects as found in Example 1 were obtained.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A polymer composition which comprises:
a polyolefin polymer containing from 0.01–2 weight percent based on said polymer of a quinophthalone pigment having the formula

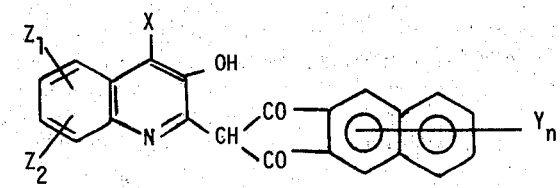

or

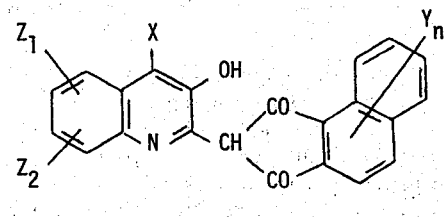

wherein X represents hydrogen or halogen, Y represents halogen, $Z_1$ represents hydrogen, halogen, lower alkyl or lower alkoxy, $Z_2$ represents hydrogen, or halogen and $n$ represents 0 or an integer of 1–4; and 0.005–5% by weight of an ultraviolet light absorbing imidazolidine compound or an ultraviolet light absorbing piperidine compound selected from the group consisting of a piperidine compound having the formula:

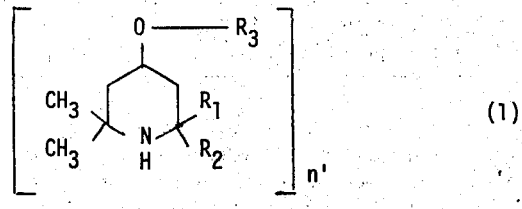
(1)

wherein $R_1$ and $R_2$ are the same or different and each represents an alkyl group or both form a saturated alicyclic ring having 5–7 carbon atoms while sharing a common carbon atom, or form a ring having the formula

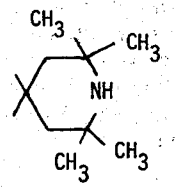

$n'$ is an integer of 1, 2 or 3; and $R_3$ represents, when $n' = 1$, a monovalent acyl group, an N-substituted carbamoyl group, an N-substituted thiocarbamoyl group, a monovalent group formed by removing one hydroxyl from an oxyacid; alkyl, cycloalkyl, aralkyl, aryl or a group having the formula

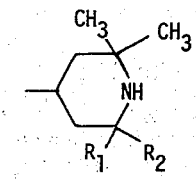

wherein $R_1$ and $R_2$ are as defined above; $R_3$ represents, when $n' = 2$, a diacyl, a dicarbamoyl, a bisthiocarbamoyl, a carbonyl group, or a divalent group formed by removing two hydroxyl groups from an oxyacid; an alkylene, an arylene, or an arylenedialkylene group; or $R_3$ represents, when $n' = 3$, a triacyl group, a tricarbamoyl group, a tristhiocarbamoyl group, a trivalent group formed by removing three hydroxyl groups from an oxyacid; an alkanetolyl group, an arylinetolyl group or an arylinetolyl trialkylene group;

piperidine-4-spiro-hydantoin derivatives having the formula:

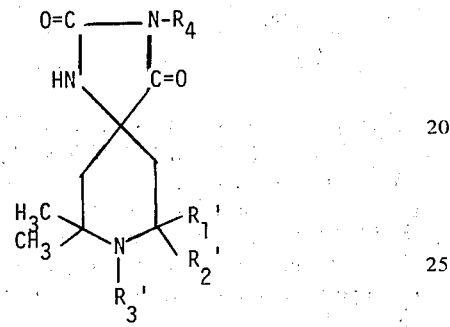

wherein $R_1'$ and $R_2'$ are the same or different and each represent an alkyl group or both form a saturated alicyclic ring having 5–7 carbon atoms while sharing a common carbon atom, or form a ring having the formula

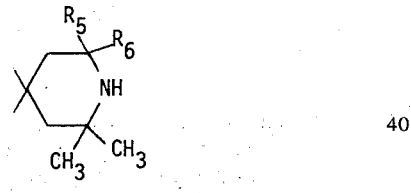

wherein $R_5$ and $R_6$ are the same or different and each represents an alkyl group or both form a saturated alicyclic ring having 5–7 carbon atoms while sharing a common carbon atom; $R_3'$ and $R_4'$ are the same or different and each represents hydrogen, an alkyl group, a cycloalkyl group or an aryl group and can have an oxirane oxygen;

a piperidine derivative or organic acid salt thereof having the formula

(3)

wherein $R_1$ and $R_2$ are the same or different and each represents an alkyl group or both form a saturated alicyclic ring having 5–7 carbon atoms while sharing a common carbon atom, or form a ring having the formula

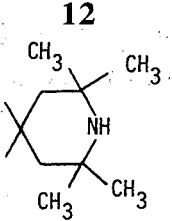

and $R_3''$ and $R_4'$ are the same or different and each represents cyano, aryl, alkoxycarbonyl, acyl or carbamoyl;

a piperidine derivative or organic acid salt thereof having the formula

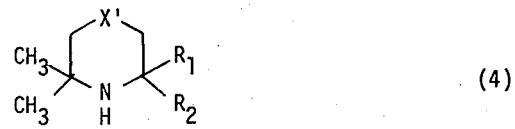

(4)

wherein $R_1$ and $R_2$ are as defined in formula (3) and $X'$ represents

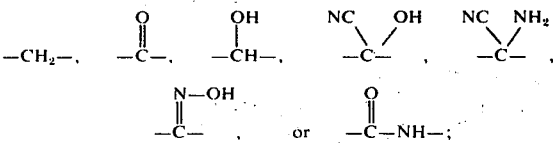

and an iminopiperidine derivative or organic acid salt thereof having the formula:

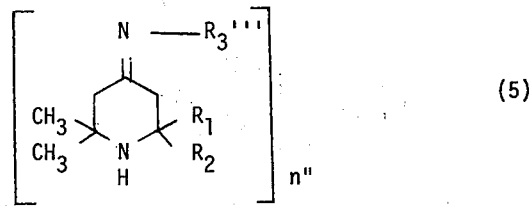

(5)

wherein $R_1$ and $R_2$ are as defined in formula (3), $n''$ represents an integer of 1 or 2, and $R_3'''$ represents, when $n'' = 1$, alkyl, aralkyl, cycloalkyl, aryl, arylamino, ureido, thioureido, or a group having the formula:

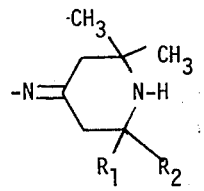

wherein $R_1$ and $R_2$ are defined in formula (3), or $R_3'''$ represents, when $n'' = 2$, a straight chain or a branched chain alkylene, cycloalkylene, arylene, or a group having the formula:

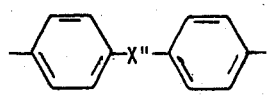

wherein X'' represents —O—, —S—, —S—S—, —NH— or —(CH$_2$)$_m$— and $m$ represents 0 or an integer from 1–6.

2. The polymer composition of claim 1, wherein the imidazolidine type ultraviolet absorbing agent is a compound having the formula

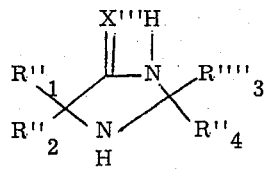

wherein X''' represents oxygen or sulfur and R''$_1$ and R''$_2$ are the same or different and each represents hydrogen, alkyl, cycloalkyl, aryl, or a heterocyclic ring, or R''$_1$ and R''$_2$ can form a saturated alicyclic ring having 5–7 carbon atoms while sharing a common carbon atom or a ring having the same formula

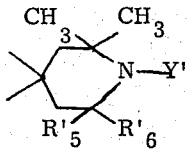

wherein R'$_5$ and R'$_6$ are the same or different and each represents an alkyl group and Y' represents hydrogen or oxygen radical, and R''''$_3$, R''$_4$ are the same as R''$_1$ and R''$_2$.

3. The polymer composition of claim 1, wherein said naphthalene ring is substituted with halogen.

* * * * *